Dec. 27, 1960       L. LORENZ ET AL       2,966,431
SEPARATION OF FILTER MATERIAL FROM CARBON BLACK
Filed March 21, 1957
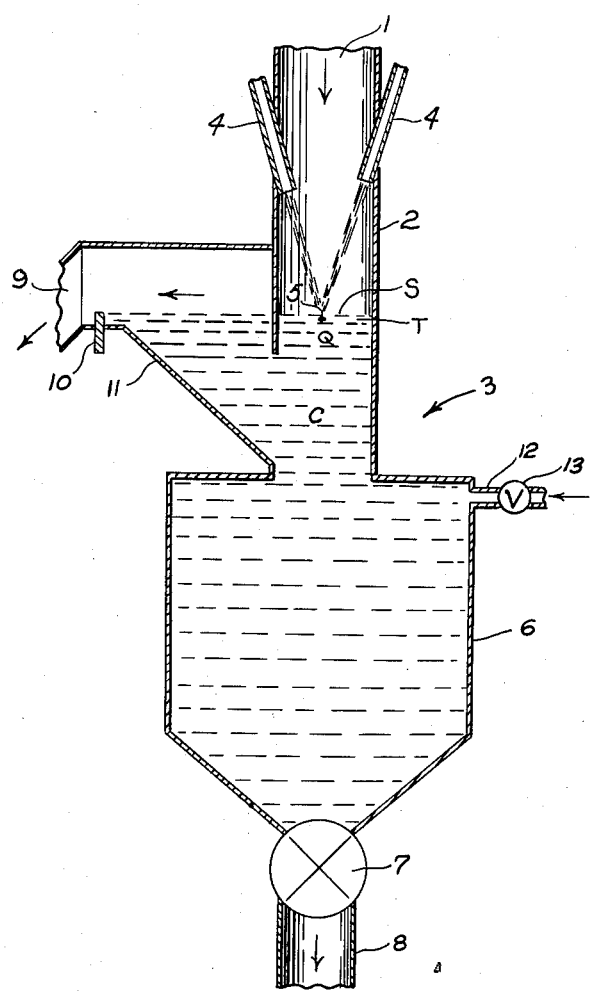
INVENTORS.
LOTHAR LORENZ
BERTHOLD ROST
BY

United States Patent Office 2,966,431
Patented Dec. 27, 1960

2,966,431

SEPARATION OF FILTER MATERIAL FROM CARBON BLACK

Lothar Lorenz and Berthold Rost, both of Ludwigshafen (Rhine), Germany, assignors to Badische Anilin- & Soda-Fabrik Aktiengesellschaft, Ludwigshafen (Rhine), Rheinland-Pfalz, Germany Filed Mar. 21, 1957, Ser. No. 647,579

Claims priority, application Germany Mar. 24, 1956

5 Claims. (Cl. 134—25)

This invention relates to a process of separating a granular filter material from carbon black which has accumulated thereon, and more particularly, to the regeneration of a spent granular filter material having an accumulation of hydrophobic carbon black and laden therewith to maximum capacity.

Certain processes have been developed for the production of carbon black in which a lower molecular weight hydrocarbon gas such as methane or ethane is burned with a limited supply of oxygen to form fine particles of carbon black which can then be collected by several well known methods. Many other processes which involve the combustion of a hydrocarbon gas or other carbonaceous fuel with air or some oxygen-containing gas also result in the formation of carbon black as an undesirable by-product which must be removed from the effluent gas stream. Where the carbon black is produced in relatively small amounts and is not a particularly valuable product, it can be satisfactorily removed from the gas stream by filtration through a layer or packed bed of a suitable granular, normally porous, filter material, coke and pumice being typical examples. The carbon black adheres to or is adsorbed upon the filter material as the gas passes through the filter bed, which is of a sufficient height to remove all the solid particles and can be operated continuously so as to remove spent filter material at the bottom while adding fresh or purified material at the top. This type of filter is often referred to as a "soot filter." The depositing of small particles of carbon black upon the relatively larger or more coarse sized grains of filter material is not a true adsorption process and is perhaps more properly defined as a form of accumulation in which the carbon black particles are more or less firmly attached, bound, or adhered to the filter material.

In order ot regenerate or purify the spent filter material which has accumulated or is laden with a large amount of carbon black, various methods of freeing the carbon black and separating it from the filter material have been attempted. In some cases, if the soot is hydrophilic, it has been sufficient to merely immerse the spent filter material in water and to separate the particles of carbon black which disassociate from the filter material by a suitable hydraulic classification method, generally based upon a sizing operation of the free settling type. Washing of the spent filter material with flowing water has also been tried. In a great many instances, especially if the soot is hydrophobic, these methods have not been satisfactory since only a portion of the carbon black is removed and separated from the filter material and the incomplete purification or regeneration results in an inefficient operation of the soot filter.

It has also been proposed to obtain a more complete separation by passing the spent filter material over baffle plates, the carbon black being loosened and falling off from the filter material by reason of the mechanical impact. The carbon black particles are then entrained in a circulating gas stream, from which they are separated in a cyclone type separator. This apparatus, however, is not very satisfactory in actual use because of the inefficiency inherent in its mechanical operation for particle liberation, classification and separation, and also because this type of apparatus is susceptible to disturbance and to mechanical breakdowns.

One object of the present invention is to provide a process which will more efficiently and completely separate or remove carbon black from a granular filter material which has accumulated the carbon black in a preceding filtering process.

Another object of the invention is to provide a process for regenerating a spent granular filter material having an accumulation of carbon black which has heretofore been extremely difficult to separate because of its apparent tendency to remain associated with the filter material.

The invention has for a particular object an efficient regeneration of an exhausted granular material having an accumulation of hydrophobic carbon black which is comparatively more difficult than the removal and separation of hydrophilic carbon black.

Other objects and advantages of the invention will be more clearly understood upon a consideration of the following detailed description and accompanying drawing which is a vertical cross-sectional view, partly in schematic form, of an apparatus which is particularly adapted for the regeneration of a spent filter material laden with hydrophobic carbon black.

The problem with which the present invention is particularly concerned relates to the difficulty of removing or liberating particles of carbon black which have accumulated on the surfaces of a relatively coarse, granular, normally porous, filter material such as coke or pumice. In some cases, the carbon black particles can be removed by a simple washing with water whereas in other cases, depending on the properties of the carbon black, this procedure is not sufficient. It is believed that this difference in the tendency of carbon black particles to adhere to a filter material and resist removal by water is caused by a difference in a relative attraction for water. In other words, certain particles of carbon black exhibit hydrophilic properties and will readily disassociate from the filter material when contacted with water while other particles of carbon black exhibit hydrophobic properties and tend to adhere more firmly to the filter material and to resist water treatment.

In accordance with the invention, it has now been found that a granular filter material can be almost completely separated from a hydrophobic carbon black which has accumulated on the material by impinging at least one high velocity jet of water against the carbon black-coated filter material which is disposed on a water surface. A plurality of high velocity water jets are preferably employed to impinge against the material at about the same point on the water surface, thus creating a turbulent effect in a zone in the vicinity of the water surface. The force of the water jet or jets is easily regulated and is sufficiently powerful to loosen or dislodge the hydrophobic carbon black from the surface of the filter material, so that particles of carbon black are dispersed in the water and the free or purified grains of filter material will sink or settle downwardly through the water. Separation of the carbon black particles from the relatively larger grains of purified filter material can be accomplished by hydraulic classification, the exact procedure depending upon the comparative floating or settling rates of the different particles in water.

Surprisingly, the exhausted filter material having an accumulation of hydrophobic carbon black was found to have a flotation rate or rate of ascent in the water or pulp suspension greater than that of the carbon black particles alone. This property permits the creation of a turbulent zone since the spent granular filter material tends to float upon a surface of water and to return to the surface after the impingement or striking action of the water jet until substantially all of the carbon black has been removed or at least effectively loosened therefrom. By directing a plurality of water jets downwardly to impinge at about the same point on the water surface, a steady circulation of the spent filter material in the turbulent zone is more readily obtained.

Filter materials which have been found especially suitable for the purposes of the invention include coke and pumice stone, the latter being a light porous stone of volcanic origin containing silicates of aluminum, sodium and potassium. Those skilled in the art can easily select other suitable granular filter materials or determine their effectiveness by carrying out routine experiments. The filter material employed is preferably normally porous and of a relatively coarse size as compared to the carbon particles, e.g., from about 1 to 10 millimeters. The following table lists a number of the preferred properties of filter materials which have been effectively employed in the invention and provides a comparison with the same properties of carbon black.

| Filter Material | Particle size, millimeter | Floating Rate (↑) and Settling Rate (↓), |
| --- | --- | --- |
| 1. Carbon black | <0.001 | ↑ 1 cm./sec. |
| 2. Coke | 1–10 | ↓ 7–15 cm./sec. |
| 3. Coke, laden with carbon black | 1–10 | ↑ about 15 cm./sec. |
| 4. Pumice stone | 1–10 | ↓ 5–12 cm./sec. |

Directly below the turbulent zone in which the spent filter material is treated by impingement with the water jets, it is highly advantageous to maintain a relatively quiescent zone in which water is dithdrawn downwardly at a flow speed which is less than the floating rate or speed of ascent of the spent filter material but which is greater than the speed of ascent of the carbon black particles. This quiescent zone effectively separates the carbon black particles, which are carried along with the downward flow of water, from the spent filter material which tends to rise to the water surface. The purified granular filter material also falls through this quiescent zone.

The carbon black particles are then separated from the purified filter material by hydraulic classification which can be most effectively accomplished by passing the water from the quiescent zone into a classifying zones in which the carbon black particles ascend and in which water carrying the carbon black particles is withdrawn in a direction deviating from the more rapidly settling or falling grains of purified filter material.

This separation or hydraulic classification of the carbon black particles is even further improved by introducing a stream or current of water into the classifying zone transversely to the downward flow of water in the quiescent zone. By introducing the transverse stream of water at a point spaced downwardly from the discharge of water out of the quiescent zone into the classifying zone and by withdrawing water as overflow at the top of the classifying zone, the water current flows in a direction which is partially or substantially countercurrent to the direction of fall of the purified filter material. Such transverse and/or countercurrent flow acts to further remove any remaining carbon black particles which have been loosened but are still associated with the filter material.

Referring now to the drawing, the single figure illustrates one form of apparatus which has been found to be particularly suitable for carrying out the process according to this invention.

The spent filter material is introduced or dropped continuously into an inlet 1 at the top of a cylindrical tube 2 and collects on a water surface within the tube, the water being contained in a larger vessel 3 which at least partially surrounds the tube 2 or provides a sufficient lateral volume to permit a lateral flow of water beneath the tube. High velocity jets of water are directed downwardly from a plurality of suitable nozzles 4 which are advantageously arranged symmetrically upon the walls of the tube 2 such that the jets impinge at about the same point 5 on the water surface in the tube. This point 5 is preferably located on or near the longitudinal axis of the cylindrical tube 2. A turbulent zone T is created at or near the surface of the water in which the spent filter material is constantly mixed and circulated by the jets of water.

The spent filter material thus remains on the water surface S or rises again to that surface until it has been practically freed of adherent carbon black. The free or substantially purified filter material then falls through a relatively quiescent zone Q and a classifying zone C into the lower collecting tank or bin 6 of the water-filled vessel 3. The purified filter material can then be removed continuously or intermittently through any suitable discharge valve or similar device 7 and withdrawn through pipe 8 as indicated by the arrow.

Water containing carbon black particles dispersed therein is withdrawn by overflow means including an outlet 9 and an adjustable weir 10 located at the upper end of a laterally extending spout 11 which encloses the classifying zone C and is arranged above the collecting tank 6. The downward flow of water through the quiescent zone Q can be regulated by suitably adjusting the flow of water to the nozzles.

A sufficient lateral current of water is provided by the overflow discharge to remove most of the dispersed carbon black which tends to float in the classifying zone C. However, it is preferable to introduce an additional transversely flowing stream of water through pipe 12 controlled by valve 13 and located just below the classifying zone C in the collecting tank 6. This stream of water serves to further classify or separate the carbon black particles in the classifying zone C by rinsing or washing and descending particles. This stream at least partially flows in a direction countercurrent to the falling or settling filter material free of carbon black to carry away the carbon black particles.

The following example, given with reference to the accompanying drawing, will further illustrate this invention, but the invention is not limited to this example.

*Example*

Coke with a grain size of 2 to 8 millimeters is employed as a filter material in a packed column through which is led 1600 cubic meters per hour of a gas, previously washed with water, which has been obtained by reaction of methane with oxygen and which contains 2.1 grams of carbon black per cubic meter. Through a shaking grate at the lower end of the column, 450 liters of coke are withdrawn hourly containing 3.35 kilograms of carbon black, and this coke is fed into the tube 2 which has a diameter of 150 millimeters. The coke laden with carbon black has a speed of ascent of about 15 centimeters per second in the apparatus, and the carbon black separated from the coke has a speed of ascent of about 1 centimeter per second. 1.5 cubic meters of water per hour are led through three nozzles with a speed of between 15 and 25 meters per second onto the surface of the water so that the jets strike the surface in the neighborhood of the longitudinal axis of the tube. The water containing dispersed carbon black particles flows downwards through the portion of the tube extending about 100 millimeters below the water surface and is then withdrawn laterally by means of the overflow. This overflow water contains practically all of the carbon black which has been removed from the packed column with the coke. The regenerated coke leaving the pipe at the bottom of the vessel still contains about 200 grams of carbon black per 450 liters of coke. Thus, about 94% of the carbon black contained in the coke is removed with the water. If about 1 cubic meter per hour of water is introduced through laterally against the falling coke as by pipe 12, the regenerated coke contains only 150 grams of carbon black per 450 liters of coke.

By comparison, if a regeneration of the same coke material is attempted with the above mentioned prior method in which the particles are separated with a circulated gas, the coke still contains about 1.4 kilograms of carbon black per 450 liters of coke. Thus about 44% of the carbon black accumulated by the coke in the filtering operation still remains adhered to the coke.

The large recovery of carbon black obtained by the process and apparatus of the invention is accomplished in an economical manner with a minimum of moving parts and a small energy input into the separation and classification system. The highly purified or regenerated filter material can be recycled to a filter bed for reuse, and because of its greater adsorption capacity as compared to previous regenerated filter materials, requires a correspondingly smaller quantity of filter material in the various steps of filtration and regeneration. The use of high velocity jets of water to loosen or dislodge adherent particles of carbon black from larger particles of filter material is capable of being combined in an effective manner with a hydraulic classification of the separated particles.

Since various modifications of the process and apparatus may be easily made by those skilled in the art without departing from the spirit of the invention, it is to be understood that the invention is not limited by the more specific description and illustration of preferred embodiments herein except as defined in the appended claims.

We claim:

1. A process for regenerating an exhausted granular filter material having an accumulation of hydrophobic carbon black which comprises: introducing said exhausted filter material for flotation upon a water surface; impinging at least one high velocity jet of water against said floating exhausted filter material with sufficient force to loosen particles of hydrophobic carbon black therefrom; and withdrawing the loosened carbon black particles and the regenerated granular filter material downwardly from said water surface and separating them from each other by hydraulic classification.

2. A process as defined in claim 1 wherein a plurality of high velocity jets of water impinge against said exhausted filter material at about the same point on a water surface.

3. A process for regenerating an exhausted granular filter material having an accumulation of hydrophobic carbon black which comprises: introducing said exhausted filter material for flotation upon a water surface; impinging at least one high velocity jet of water against said floating exhausted filter material so as to create a zone of turbulence in the vicinity of said water surface and with sufficient force to loosen particles of hydrophobic carbon black from said filter material; withdrawing water downwardly in a relatively quiescent zone beneath said turbulent zone at a flow speed which is less than the speed of ascent of said exhausted filter material but which is greater than the speed of ascent of said carbon black particles, regenerated filter material falling downwardly through said quiescent zone by reason of its normal settling rate, thereby separating the loosened carbon black particles and regenerated filter material from the exhausted filter material being treated in said turbulent zone; and further separating the loosened carbon black particles from the regenerated filter material in a hydraulic classification zone separate from said turbulent and quiescent zones, said regenerated filter material having a density greater than water and said loosened carbon black particles having a density lighter than water.

4. A process for regenerating an exhausted granular filter material having an accumulation of hydrophobic carbon black which comprises: introducing said exhausted filter material for flotation upon a water surface; impinging at least one high velocity jet of water downwardly against said floating exhausted filter material so as to create a zone of turbulence in the vicinity of said water surface and with sufficient force to loosen particles of hydrophobic carbon black from said filter material; withdrawing water downwardly in a relatively quiescent zone beneath said turbulent zone at a flow speed which is less than the speed of ascent of said exhausted filter material but which is greater than the speed of ascent of said carbon black particles, regenerated filter material falling downwardly through said quiescent zone by reason of its normal settling rate, thereby separating the loosened carbon black particles and regenerated filter material from the exhausted filter material being treated in said turbulent zone; and further separating said loosened carbon black particles from the granular filter material by passing the water from said quiescent zone into a separate hydraulic classifying zone in which said carbon black particles ascend and in which water carrying said carbon black particles is withdrawn in a direction deviating from the direction of fall of the regenerated filter material from which carbon black has been removed.

5. A process as defined in claim 4 wherein a stream of water is introduced in said separate classifying zone transversely to the downward flow of water in said quiescent zone.

References Cited in the file of this patent

UNITED STATES PATENTS

| | | |
|---|---|---|
| 801,200 | Bailey | Oct. 10, 1905 |
| 1,665,624 | Conrad | Apr. 10, 1928 |
| 1,966,001 | Burke et al. | July 10, 1934 |
| 2,737,960 | Anderson | Mar. 13, 1956 |

FOREIGN PATENTS

| | | |
|---|---|---|
| 724,854 | Great Britain | Feb. 23, 1955 |